Patented July 25, 1950

2,516,700

UNITED STATES PATENT OFFICE 2,516,700

COATING COMPOSITION

Donald F. Holloway and Harland H. Young, Chicago, Ill., assignors, by mesne assignments, to Swift & Company, a corporation of Illinois No Drawing. Application December 15, 1945, Serial No. 635,418

6 Claims. (Cl. 106—146)

This invention relates to the preparation of coating compositions which may be employed as adhesives, protective colloids, as in water-oil emulsions, or sizing and finishing materials for the textile and paper industries. More particularly the invention has reference to the use of casein as the protein base for such compositions.

Casein is well known for its adhesive properties. It is a protein of high molecular weight, and is insoluble in water. Because the casein molecule possesses a greater proportion of carboxyl than amino groups, it is for this reason soluble in alkalies, but insoluble in weakly acidic solutions. Therefore, in order to prepare casein glues, it has been necessary heretofore to employ alkaline materials as dissolving media for the casein. The alkaline casein glues possess the disadvantage that the alkalinity of the solution often produces deleterious effects on the material which is intended to be coated therewith. It is well known, for example, that alkalies not only discolor paper, but often weaken or destroy it. Other disadvantages in using alkaline casein solutions are that the bond formed therewith is readily soluble in water and that such solutions are subject to bacterial decomposition.

In order to do away with the undesired high alkalinity of the alkaline casein solutions, it has been proposed to employ urea to aid in the dissolution or dispersion of the casein in water, the resulting solution being neutral or only slightly alkaline. In addition to overcoming the handicap of high alkalinity of solution, the solubilizing agent urea makes it possible to treat the adhesive with a hardening agent, such as formaldehyde, to make the adhesive better resistant to water. The formaldehyde may be added to the casein urea solution as an ingredient thereof before the application of the solution to material which it is desired to treat, or the formaldehyde may be employed to harden the bond or coat laid down by the aforesaid solution. The formaldehyde in addition to being a hardening agent also serves as a preservative for the solution against bacterial action. Acceleration of the hardening process by means of the formaldehyde reaction may be achieved by the addition to the composition of an acidic salt, such as ammonium chloride, ammonium sulfate or ammonium acetate, and/or by heating the final dried composition.

The reference above to formaldehyde as a hardening agent is illustrative and other aldehydes may suitably be employed. As examples of operative aldehydes may be mentioned acetaldehyde, crotonaldehyde, propionaldehyde, glyoxal, and butyraldehyde. In general aliphatic aldehydes of from 1 to 4 carbon atoms in the molecule, as well as polymers or compounds capable of yielding these in the composition, are satisfactory hardening agents. However, since formaldehyde is particularly suitable and readily available, it is to be preferred as the hardening agent.

It has also been proposed heretofore to employ derivatives of urea, such as biuret or a mixture of biuret and cyanuric acid as solubilizing agents for the casein. These materials have an advantage of preventing enzyme attack as by urease and also do not readily hydrolyze, as is the case with urea to give off obnoxious fumes of ammonia when it is desired to heat or boil the solution.

In preparing neutral casein solutions according to the procedures hereinabove summarized, a recognized fact is that such solutions cannot be greatly diluted. It is known that there are certain limits to the amounts of water that may be added to the casein urea solution and that beyond these limits the urea casein reaction product settles out, or precipitates from solution. The amount of casein capable of being dispersed and consequently taken up by the water depends upon the concentration of the urea, so that by decreasing the urea content by dilution with water, any casein in excess of a certain ratio it bears to the urea settles out, or precipitates from solution.

Patent No. 2,262,770 to La Piana (1941) which deals with the preparation of sizing and finishing compositions for textile materials, natural or synthetic, from vegetable or animal sources, discloses a composition comprising urea and casein which may be diluted beyond the point which has been before possible so to do. This greater ability of dilution is achieved by reacting the casein to form a caseinate with ammonia and derivatives thereof, these latter being the lower aliphatic amines and quaternary ammonium bases. The aforesaid derivatives are such that give a pH of not less than 8 when in dilute solutions of around 1 per cent. Therefore, in order to effect dilution of the casein urea solutions indefinitely without precipitation of the casein, it has been necessary heretofore to maintain the pH of the solution on the alkaline side.

It is the general object of this invention to prepare a casein solution of a neutral or acid pH and yet capable of infinite dilution.

Another object of the invention is the preparation of solutions comprising urea and casein, whose viscosity may be varied within wide limits.

A further object of the invention is the preparation of a casein solution immune to bacterial action without the use of formaldehyde as an ingredient of the casein solution.

Other objects will appear from the description given below.

According to prior methods, greater dispersion of the casein and hence the increase in solubility thereof, is achieved by the reaction of the base with the casein.

The function of the urea, in addition to dispersing the casein, is to plasticize the mixture and also to react with the hardening agent, such as formaldehyde or acetaldehyde, to make the composition resistant to water.

The present invention is based on the discovery that the incorporation of the ingredients hereinafter to be described into a solution of urea, or derivatives thereof, such as biuret, and casein has the power of so effectively dispersing the casein, or of aiding the urea in dispersing the casein, as to make possible infinite dilution of the solution without precipitation of any casein as such or as its condensation products with the other reactants. This dilution may be carried out at a pH of about 5.5 to 7.0, an effect which has heretofore been impossible to achieve. Another effect of these substances is to impart viscosity to the casein urea solution, which viscosity may be varied within wide limits, depending on the amount of dispersing medium employed. The ability to vary the viscosity of the solution results in better control in applying the solution to the material to be coated and prevents waste. When a solution flows too freely, it often leaves, or spills from, the surface which is intended to be treated, thus necessitating the use of an excess of solution and thus often unduly wetting the material to be treated. An additional property of our dispersing agents, as hereinabove mentioned, is their preservative action on the composition. Through the use of our materials it is possible to prevent bacterial destruction of the casein urea material. This feature has an advantage of making possible the preparation of a water-soluble casein coating or adhesive composition which resists bacterial decomposition, and does away with the need of formaldehyde used for its preservative action. The formaldehyde in addition to preserving casein, promotes hardening and an increase in resistance to water of the composition which may not be desired for the particular purpose at hand. However, if a water-insoluble composition is desired, a suitable aldehyde may be employed to harden the composition, as hereinabove described.

In accordance with this invention, the compounds that may be used are the monoalkali metal salts of phenol, naphthol, anthrol, and derivatives thereof. The alkali metal mono salts of phenol, o-phenylphenol, 2, 4, 5, trichlorophenol, 2-chloro 6-phenylphenol, 3-chloro-p-phenylphenol, 2-bromo-4-phenylphenol, tetrachlorophenol, 2,4-dichloro-1-naphthol, 9-bromo-10-anthrol, and pentachlorophenol, give good results. The compounds with which this invention is concerned may be represented by the following general formulas:

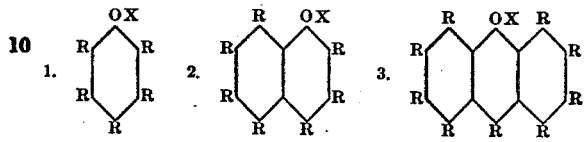

wherein R is a radical chosen from a group consisting of hydrogen, halogen, hydroxy, nitro, alkyl, aryl, alkaryl, alkoxy and aroxy radicals. In the formulas, X represents an alkali metal such as sodium potassium or lithium. Those derivatives of phenol in which the substituent groups impart the greatest acidity to the molecule are preferred. Accordingly, the preferred specific compound is the alkali metal salt of pentachlorophenol. The aforementioned compounds may be referred to generally as the monoalkali metal salts of hydroxy substituted aromatic compounds or arylhydroxide compounds and will be referred to as such in the claims.

Although animal casein has been referred to as the preferred water-insoluble protein, other water-insoluble proteins may be satisfactorily employed. These are, for example, soybean, castor bean and peanut proteins.

In order to illustrate generally suitable casein sizing and finishing, and adhesive compositions prepared in accordance with the present invention, the following example is given. The parts are by weight.

| | Parts |
|---|---|
| Casein | 15 to 35 |
| Urea | 15 to 35 |
| Water | 25 to 50 |
| Formalin | 1 to 10 |
| Phenol, anthrol, or naphthol derivatives | 1 to 5 |

As a more specific illustrative example of a water-soluble casein solution capable of infinite dilution, the following example is given. The parts are by weight.

| | Parts |
|---|---|
| Casein | 25 |
| Urea | 25 |
| Water | 45 |
| Sodium salt of pentachlorophenol | 1.25 |

Although in all the examples urea is mentioned as an ingredient, it may be omitted and the derivatives of phenol, naphthol, and anthrol hereinabove mentioned may be used alone to disperse the casein. It is not known exactly how these substances work, but we have found that a combination of these substances with urea produces more than additive results. The conjoint use of urea and the derivatives mentioned above produces synergistic effects.

The coating composition herein described may be prepared by adding to the mixture of water, urea, and the water-insoluble protein, the monoalkali metal salt of hydroxy-substituted aromatic compound in an amount sufficient to substantially solubilize and disperse the water-insoluble protein. Said composition may be substantially infinitely diluted at a pH of 7 or lower without precipitation of the water-insoluble protein. An aldehyde having one to four carbon atoms in the molecule may be added to the composition to cause setting and hardening upon application thereof to the material to be treated.

Obviously, many modifications and variations of the invention hereinbefore set forth may be made without departing from the spirit and scope thereof, and, therefore, only such limitations should be imposed as are indicated in the appended claims.

We claim:

1. A coating composition substantially immune to bacterial decomposition and capable of substantially infinite dilution at a pH of 7 or lower without precipitation of water-insoluble protein, consisting essentially of the following ingredients in about the following parts by weight: a protein selected from the class consisting of casein and a water-insoluble vegetable protein, 15 to 35; urea, 15 to 35; water, 25 to 50; and 1 to 5 of a monoalkali metal salt of a phenylhydroxy derivative of the general formula

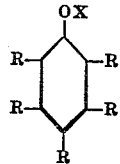

where R represents radicals selected from the group consisting of hydrogen, hydroxy, halogen, nitro, alkyl, aryl, alkaryl, alkoxy, and aroxy, and X is an alkali metal.

2. A coating composition as described in claim 1 wherein the monoalkali metal salt is sodium pentachlorophenolate.

3. A coating composition as described in claim 1 wherein the monoalkali metal salt is sodium ortho phenylphenolate.

4. A coating composition as described in claim 1 wherein the monoalkali metal salt is sodium 2, 4, 5, trichlorophenolate.

5. A coating composition as described in claim 1 wherein the monoalkali metal salt is sodium 2-chloro-6-phenylphenolate.

6. A coating composition as described in claim 1 wherein the monoalkali metal salt is sodium 3-chloro-p-phenylphenolate.

DONALD F. HOLLOWAY.
HARLAND H. YOUNG.

REFERENCES CITED

The following references are of record in the file of this patent:

UNITED STATES PATENTS

| Number | Name | Date |
|---|---|---|
| 1,725,805 | Landecker | Aug. 27, 1929 |
| 1,947,498 | Scholz | Feb. 20, 1934 |
| 2,262,770 | La Piana | Nov. 18, 1941 |
| 2,280,546 | Schuler | Apr. 21, 1942 |
| 2,351,109 | Corwin | June 13, 1944 |
| 2,433,783 | Paterek | Dec. 30, 1947 |